(12) United States Patent
Kilpinen

(10) Patent No.: US 8,102,675 B2
(45) Date of Patent: Jan. 24, 2012

(54) APPARATUS, METHOD, AND COMPUTER PROGRAM FOR USING A DRIVER WHEEL TO PROVIDE A PLURALITY OF HOUSING CONFIGURATIONS

(75) Inventor: Janne Tapani Kilpinen, Toijala (FI)

(73) Assignee: Nokia Corporation, Espoo (FI)

( * ) Notice: Subject to any disclaimer, the term of this patent is extended or adjusted under 35 U.S.C. 154(b) by 412 days.

(21) Appl. No.: 12/424,451

(22) Filed: Apr. 15, 2009

(65) Prior Publication Data

US 2010/0265686 A1 Oct. 21, 2010

(51) Int. Cl.
*H04B 1/03* (2006.01)
*H05K 5/02* (2006.01)

(52) U.S. Cl. ........ 361/814; 361/724; 361/725; 361/727; 361/679.56; 361/679.26; 361/679.27; 361/679.28; 361/679.3; 361/755; 455/575.1; 455/575.2; 455/575.4

(58) Field of Classification Search .................. None
See application file for complete search history.

(56) References Cited

U.S. PATENT DOCUMENTS

| | | | | |
|---|---|---|---|---|
| 5,102,084 | A * | 4/1992 | Park ........................ | 248/286.1 |
| 6,993,128 | B2 * | 1/2006 | Eromaki .................... | 379/433.12 |
| 7,353,053 | B2 * | 4/2008 | Prichard et al. ............ | 455/575.4 |
| 7,639,477 | B2 * | 12/2009 | Ikunami .................... | 361/679.01 |
| 2005/0064921 | A1 | 3/2005 | Jeong et al. | |
| 2008/0170358 | A1 | 7/2008 | Ikunami | |
| 2009/0122015 | A1 | 5/2009 | Demuynck | |
| 2009/0227301 | A1 | 9/2009 | Lindvall | |

FOREIGN PATENT DOCUMENTS

| | | |
|---|---|---|
| EP | 2 051 485 | 4/2009 |
| FR | 2739470 | 4/1997 |
| JP | 2006-186577 | 7/2006 |
| KR | 100619183 | 8/2006 |
| WO | WO2006/126424 | * 11/2006 |

OTHER PUBLICATIONS

International Search Report for PCT Application No. PCT/FI2010/050128 dated May 18, 2010.

* cited by examiner

*Primary Examiner* — Hung S Bui
*Assistant Examiner* — Dion Ferguson
(74) *Attorney, Agent, or Firm* — Harrington & Smith

(57) ABSTRACT

Described herein is an apparatus having first and second housings and a driver wheel. The first and second housings are coupled together so that they can be driven by the driver wheel to provide for a plurality of apparatus configurations. The apparatus is configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another. The apparatus is also configured such that continuous rotation of the driver wheel drives the movement of the apparatus from the first configuration to the second configuration and then onto the third configuration.

14 Claims, 14 Drawing Sheets

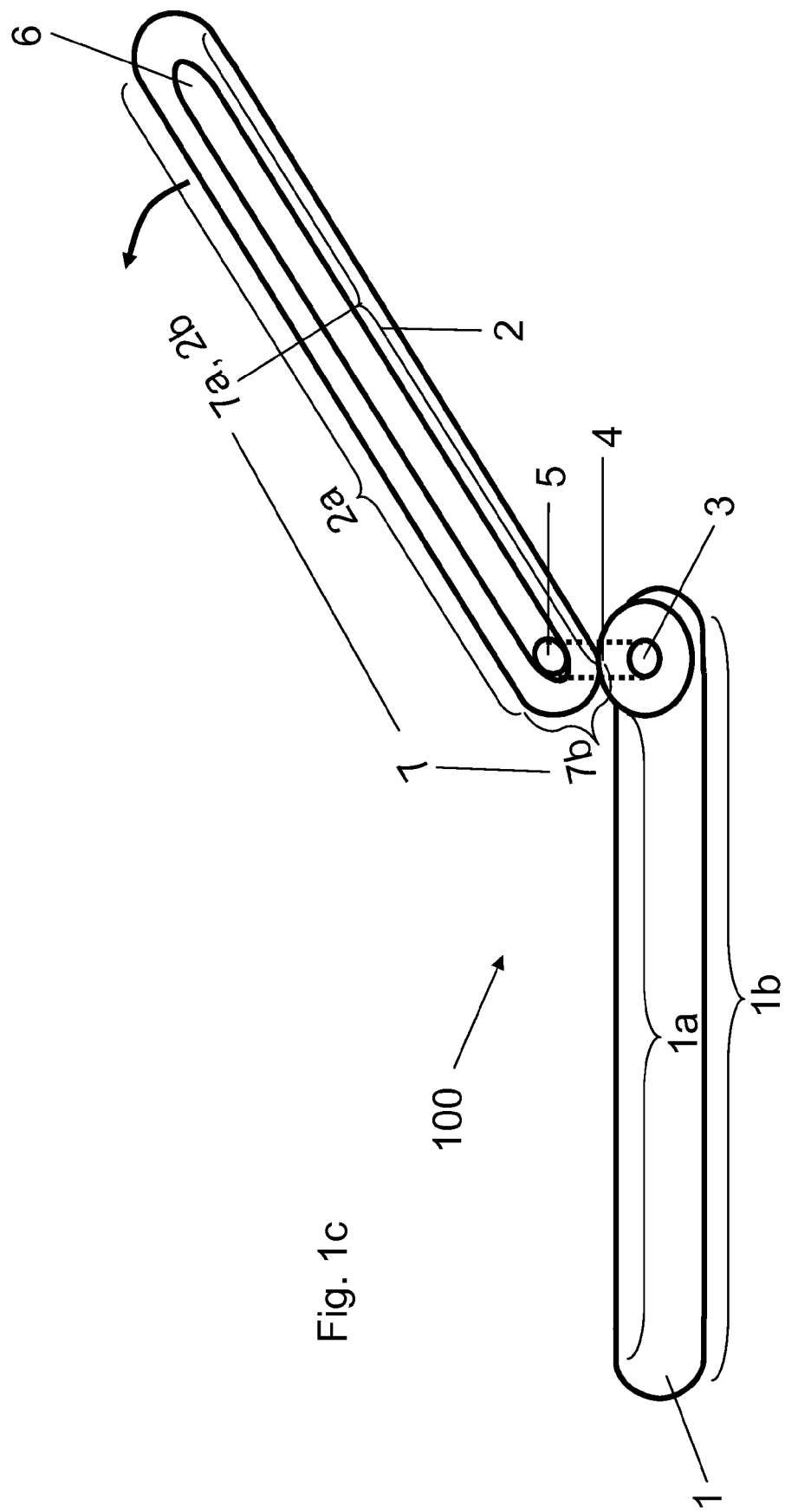

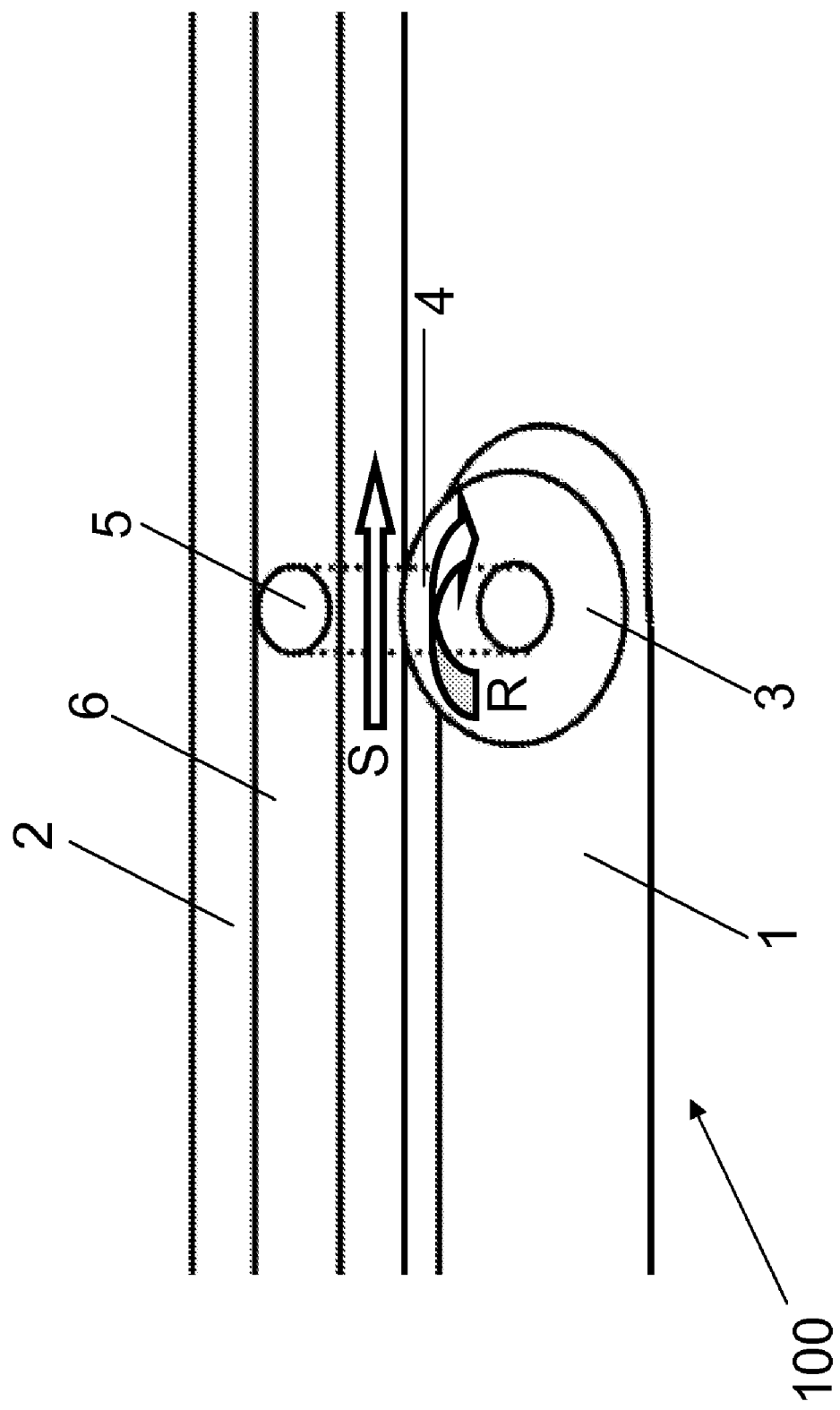

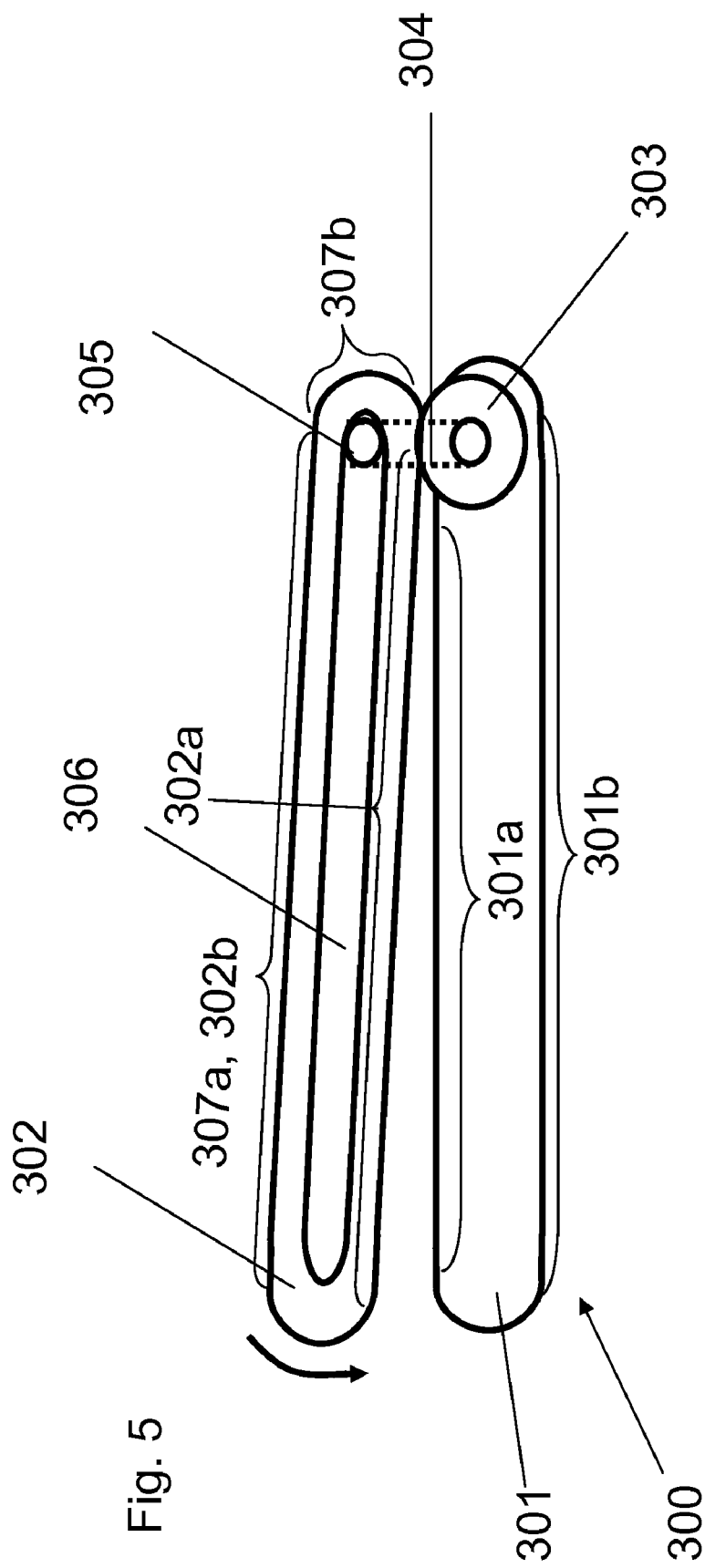

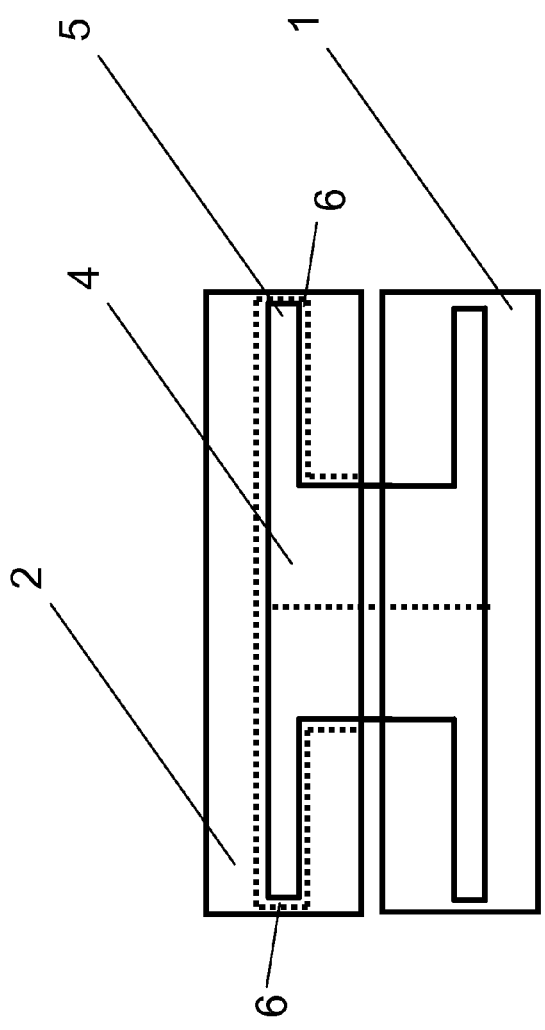
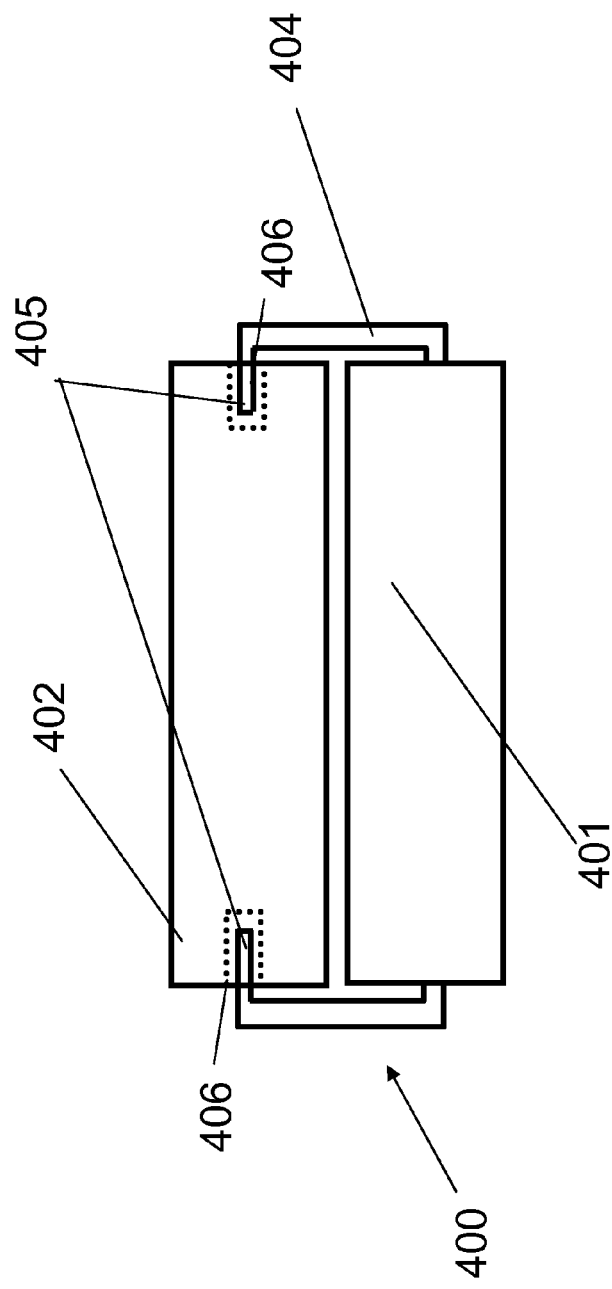
Fig. 6a
Fig. 6b

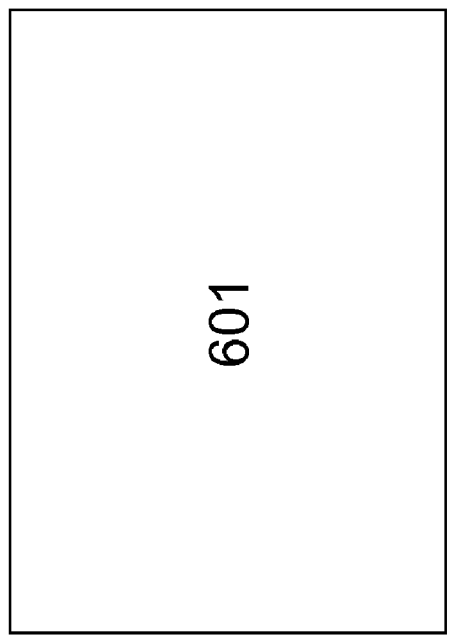
Fig. 8 — 601
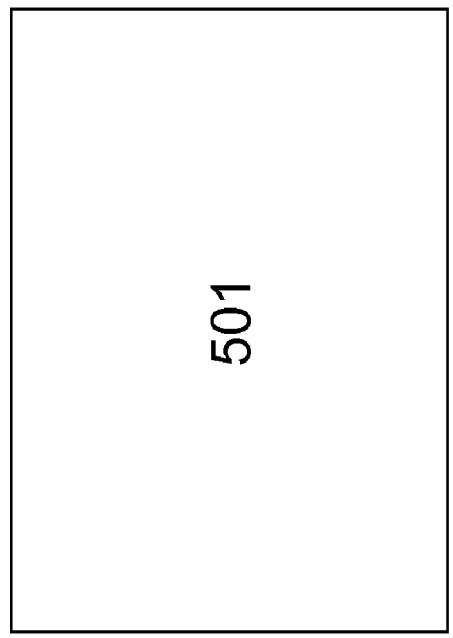
Fig. 7 — 501

APPARATUS, METHOD, AND COMPUTER PROGRAM FOR USING A DRIVER WHEEL TO PROVIDE A PLURALITY OF HOUSING CONFIGURATIONS

TECHNICAL FIELD

The present disclosure relates to the field of slide-tilt mechanisms, associated methods, computer programs and corresponding apparatus. Certain disclosed aspects/embodiments relate to portable electronic devices, in particular, so-called hand-portable electronic devices which may be hand-held in use (although they may be placed in a cradle in use). Such hand-portable electronic devices can also include Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Many hand-portable electronic devices have a two-part housing consisting of, for example, a display and keypad housed in different body parts. In a closed configuration the keypad is hidden under the part containing the display. The form factor can be opened to reveal the keypad, using either a sliding or a tilting motion, or a combination of the two.

Handsets which combine sliding and tilting motion of the body parts are becoming increasingly popular. WO 2008/000288 illustrates an example of such a slide-tilt mechanism. This has been mentioned only to give an example of such a mechanism. This document does not disclose the invention described herein.

Some slide-tilt arrangements allow for adjustment of the angle of the display relative to the keypad. This can improve user comfort in many situations compared with a slide-only mechanism.

There are also devices in which a motor is used to drive the opening mechanism. There are, for example, clamshell phones which have a motor at the hinge line of the mechanism.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising a first and second housing and a driver wheel, the first and second housings coupled together to be driven by a driver wheel to provide for a plurality of apparatus configurations, the apparatus being configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another, and wherein the apparatus is configured such that continuous rotation of the driver wheel drives the movement of the apparatus from the first configuration to the second configuration and then onto the third configuration.

The use of a driver wheel in this way allows for the apparatus to be driven between the various configurations by continuous rotation of the same driver wheel. This alleviates the need for separate mechanisms for each movement of sliding and tilting as it exists in the prior art.

The driver wheel of the apparatus may be configured to be in direct drive contact with a profiled exterior/interior surface of the second housing. The surface of the second housing is shaped to have a certain contour or profile such that the continuous rotation of the driver wheel against this surface causes the necessary movement of the apparatus (via sliding and/or tilting motion).

The driver wheel of the apparatus may be configured to be frictionally coupled to the profiled surface of the second housing such that continuous rotation of the driver wheel frictionally drives the movement of the apparatus from the first configuration to the second configuration and then onto the third configuration.

The driver wheel of the apparatus may be a toothed wheel configured to be coupled with a complementary track provided by the profiled surface of the second housing.

The apparatus may comprise an arm that extends from the first housing to a groove provided in the second housing, the arm comprising a projecting member configured to slidably couple with the groove to provide for the coupling of the first and second housings, the arm, projecting member and groove configured to provide for the slidable movement of the apparatus between the first and second configurations.

The groove in the second housing may comprise a first and second end, the apparatus configured such that the slidable movement of the projecting member is terminated by engagement of the groove with the first end to provide the first configuration, and the second configuration, and the termination of said slidable movement, is provided by the engagement of the projecting member with the second end.

The apparatus may be configured such that the engagement of the projecting member at the second end provides a pivot point, the apparatus being configured to be movable from the second configuration to the third configuration by rotation of the second housing about the pivot point, said rotation being driven by continuous rotation of the driver wheel.

This coupling configuration allows the apparatus to be slidably moved from the first configuration to the second configuration by way of the projecting members in the corresponding grooves. This coupling also allows the apparatus to be moved from the second configuration into the third, tilted configuration by rotation of the second housing about the pivot point defined by the engagement of the projecting members with the second end of the grooves.

The profiled surface of the second housing may comprise a first portion configured to provide for slidable movement of the apparatus from the first configuration to the second configuration, and a second portion configured to provide for rotation of the second housing relative to the first housing to move the apparatus from the second configuration to the third configuration, the second portion being located proximal to a provided pivot to provide for movement between the second and third configurations.

The first portion of the profiled surface may be configured to be substantially linear to provide for slidable movement of the apparatus, and the second portion of the profiled surface is configured to be substantially curved to provide for rotation of the second housing about the pivot.

The second portion of the profiled surface may comprise one or more detents, each detent being configured to define a corresponding detent tilted position of the second housing relative to the first housing in the third configuration.

The driver wheel of the apparatus may be rotatably coupled to the first housing.

The apparatus may comprise a motor configured to drive the rotation of the driver wheel. By providing a motor it is possible to provide for a smooth, continuous automatic movement of the apparatus from the first configuration to the second and onto the third, for example.

The apparatus may also comprise a biasing mechanism configured to drive the rotation of the driver wheel. By providing a biasing mechanism such as a coiled spring it is possible to effect rotation of the wheel and thereby drive the lateral sliding and the tilting movement of the second housing relative to the first housing.

The apparatus may be configured to continuously rotate the driver wheel in the same direction to drive for movement of the apparatus from the first configuration to the second configuration and onto the third configuration.

The apparatus may be configured such that reverse rotation of the driver wheel provides for reverse movement from the third configuration to the second configuration and then onto the first configuration.

The first and second housings of the apparatus may be configured to be laterally slidable with respect to one another along a substantially linear path. This allows for a slide-tilt apparatus in which the respective housings can slide apart relative to one another along a straight or linear path, in a similar fashion to a slide phone, for example.

The driver wheel may be a cylindrical drum, such a drum being, for example, a wheel with a significant thickness. The driver wheel may have a cam or circular/elliptical shaped profile to drive the movement of the apparatus between the configurations of the apparatus. The apparatus may comprise one or more driver wheels.

The apparatus may be configured to be movable from the third configuration to a further fourth configuration in which the first and second housings are substantially overlapping by continued rotation of the second housing relative to the first housing. The fourth configuration of the apparatus may be substantially the same configuration as the first configuration to thereby allow the apparatus to be moved through a cycle of configurations by continuous rotation of the driver wheel.

One or more driver wheels/projecting members/arms/grooves may be used according to the specific requirements.

In a further aspect, there is provided an electronic device comprising the abovementioned apparatus of the first embodiment.

In a further aspect, there is provided a method of assembling an apparatus, the apparatus comprising a first and second housing and a driver wheel, the first and second housings coupled together to be driven by a driver wheel to provide for a plurality of apparatus configurations, the apparatus being configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another, and wherein the apparatus is configured such that continuous rotation of the driver wheel drives the movement of the apparatus from the first configuration to the second configuration and then onto the third configuration; the method comprising assembling the driver wheel and the first and second housings such that continuous rotation of the driver wheel drives the apparatus from the first configuration to the second configuration and onto the third configuration.

In a further aspect, there is provided a computer program, recorded on a carrier, the computer program comprising computer configured to, when run, control rotation of the driver wheel of the apparatus of the first embodiment so as to move the apparatus from the first configuration to the second configuration and then onto the third configuration by continuously rotating the driver wheel.

In a further aspect, there is provided an apparatus comprising a first and second means for housing and a means for driving movement, the first and second means for housing coupled together to be driven by the means for driving movement to provide for a plurality of apparatus configurations, the apparatus being configured such that the first and second means for housing are slidable relative to one another from a first overlapping configuration, in which the first and second means for housing are substantially overlapping, to a second laterally slid configuration in which the first second means for housing are laterally slid with respect to one another, and then onto a third tilted configuration in which the first and second means for housing are tilted relative to one another, and wherein the apparatus is configured such that continuous rotation of the means for driving movement of the apparatus drives the movement of the apparatus from the first configuration to the second configuration and then onto the third configuration.

In a further aspect, there is provided a method for moving an apparatus between a plurality of configurations of the apparatus, the apparatus comprising a first and second housing and a driver wheel, the first and second housings coupled together to be driven by a driver wheel to provide for a plurality of apparatus configurations, the apparatus being configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another, and wherein the apparatus is configured such that continuous rotation of the driver wheel drives the movement of the apparatus from the first configuration to the second configuration and then onto the third configuration, the method comprising:

continuously rotating the driver wheel to drive the apparatus from the first configuration to the second configuration and onto the third configuration.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 1c shows a side perspective of a third configuration of an apparatus according to the first embodiment.

FIG. 2 shows a close-up of the driver wheel of FIG. 1 and its operation during the slidable movement of the apparatus from the first configuration to the second configuration.

FIG. 5 shows the apparatus of FIG. 1 between the third configuration and a further fourth configuration.

FIGS. 6a & 6b show end-on perspectives of variations of the arm coupling of the first embodiment.

FIG. 7 shows a flowchart of the method of assembly of the apparatus.

FIG. 8 shows a flowchart of the method of a computer program for controlling rotation of the driver wheel of the apparatus.

DESCRIPTION OF SPECIFIC ASPECTS/EMBODIMENTS

In one or more embodiments described herein, there is provided an apparatus having a slide-tilt mechanism, the apparatus being configured such that continuous rotation of a driver wheel drives the movement of the apparatus from the first configuration to the second configuration and then onto the third configuration.

Figure 1A:
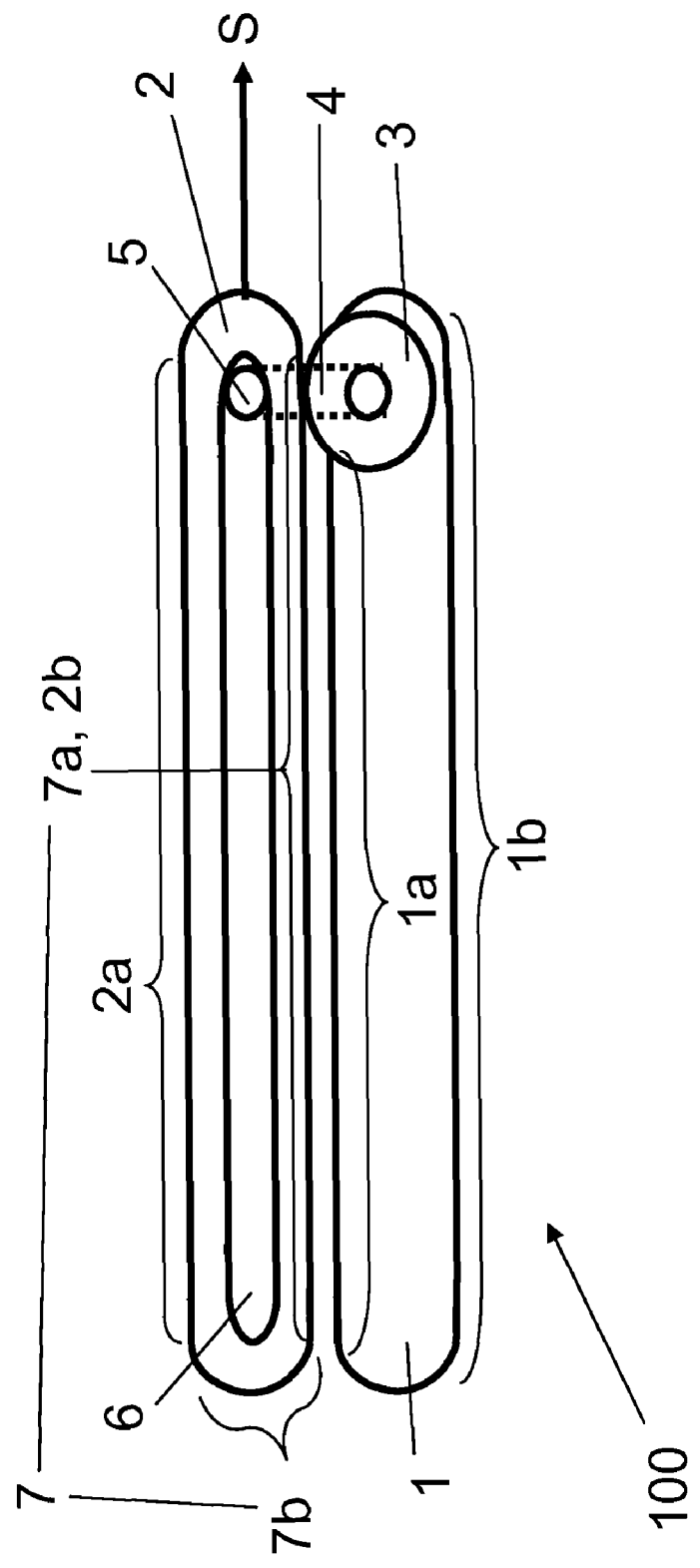
FIG. 1a shows a side perspective of a first configuration of an apparatus according to the first embodiment.
Figure 1B:
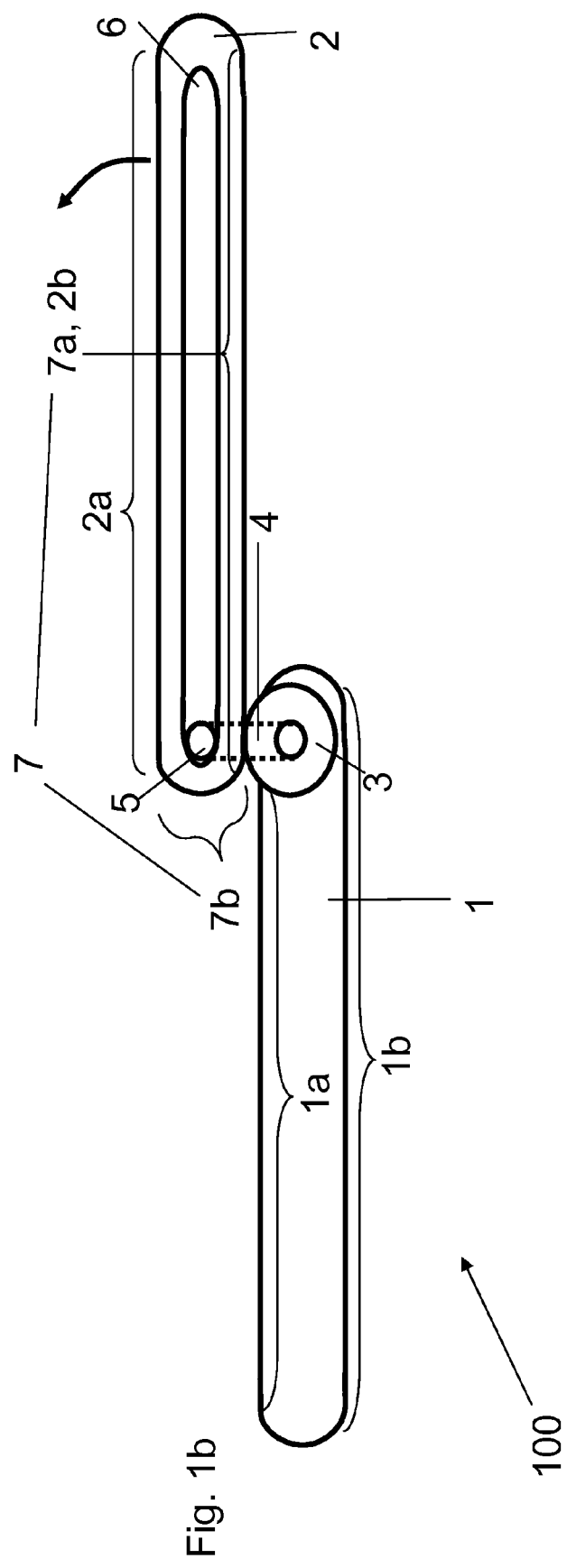
FIG. 1b shows a side perspective of a second configuration of an apparatus according to the first embodiment.
Figure 10A:
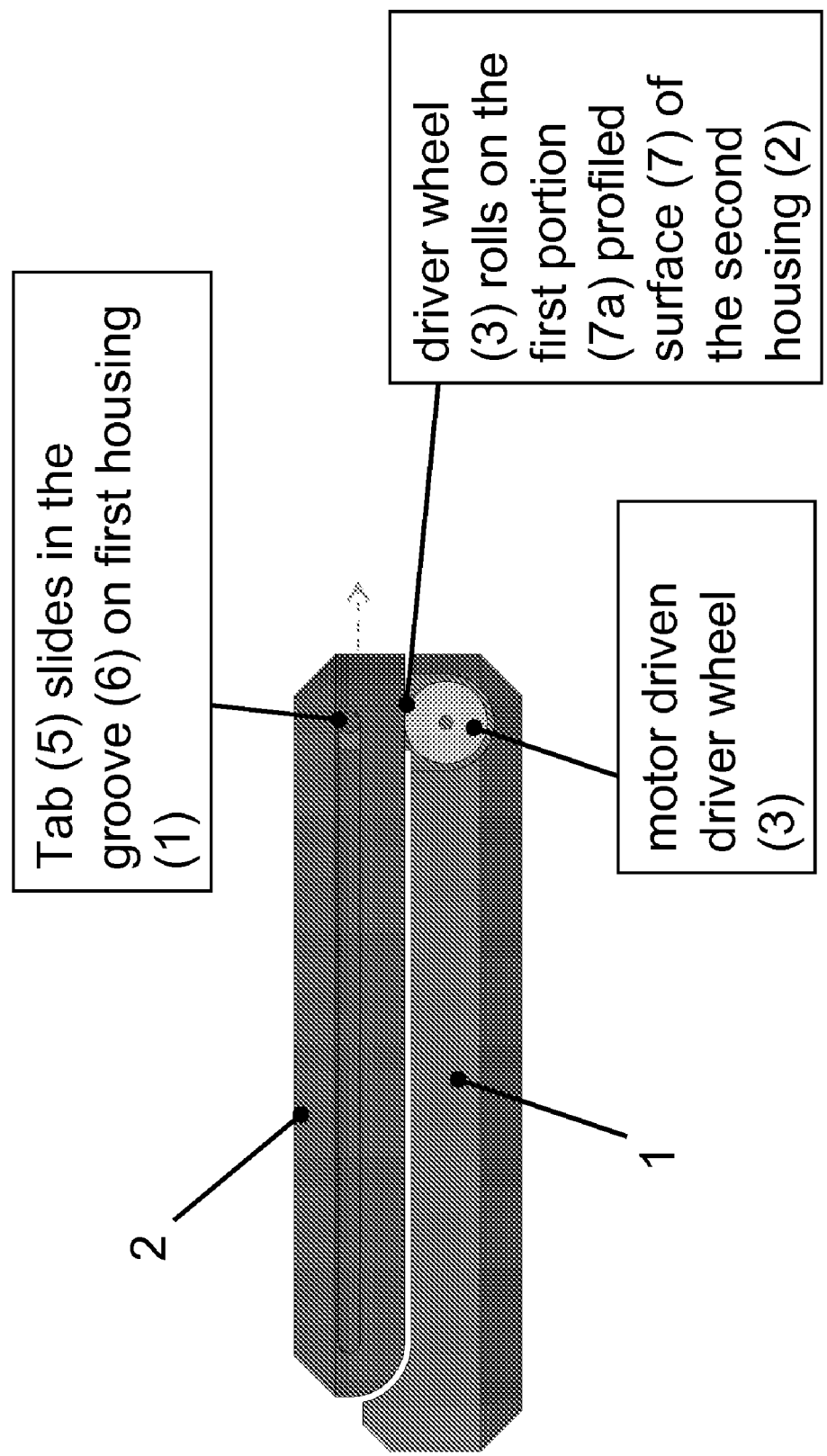
FIGS. 10a-10c show a side-perspective illustration of the first embodiment of the apparatus.
Figure 10B:
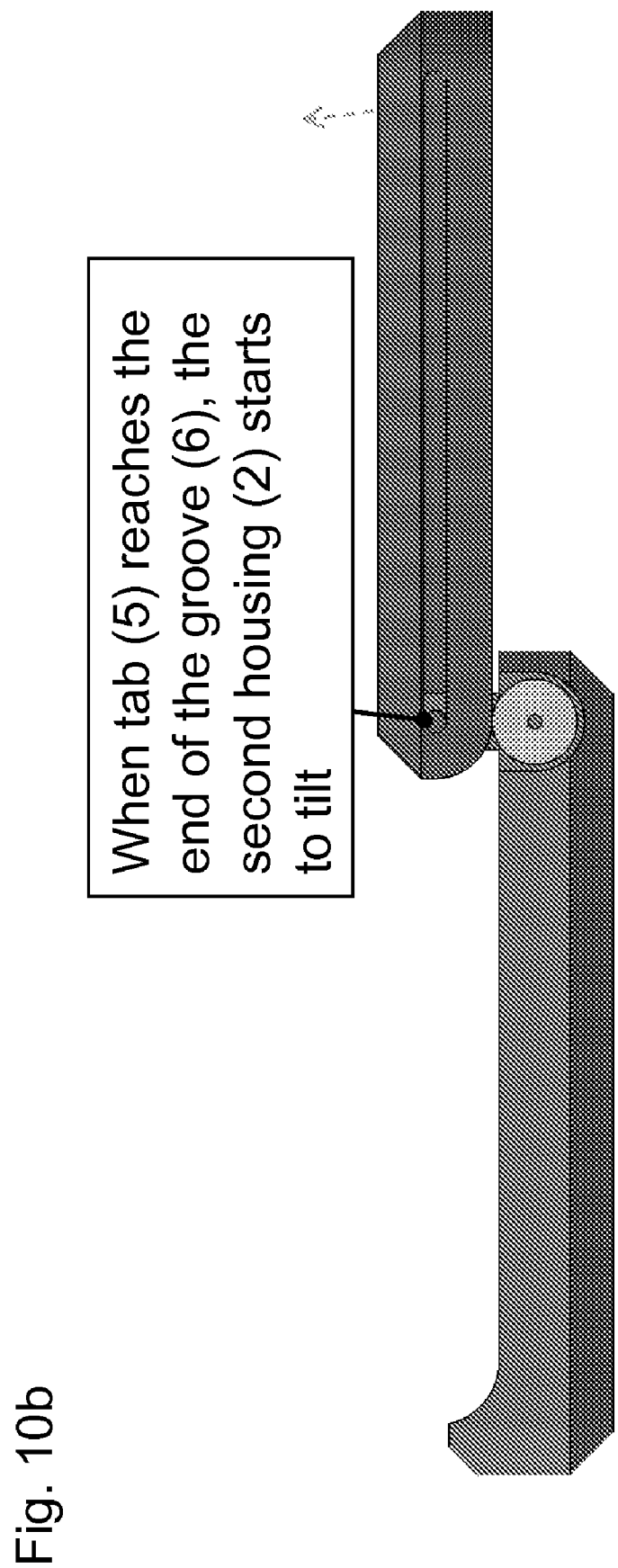
Figure 10C:
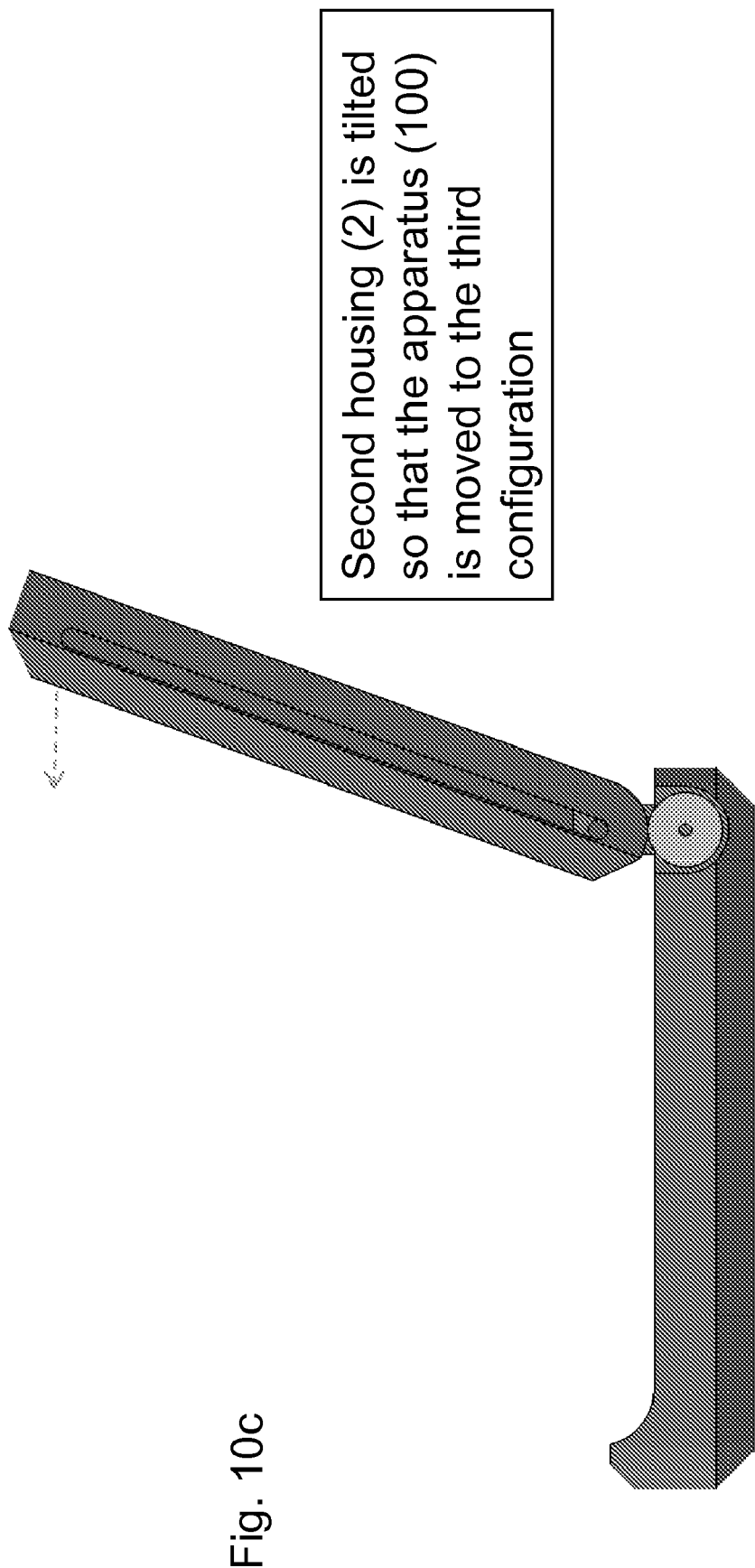

FIGS. 1a-1c show the first, second and third configurations (respectively) of such an apparatus 100 having a slide-tilt mechanism according to a first embodiment, (an illustration of the apparatus of this embodiment can be seen in corresponding FIGS. 10a-10c). The apparatus 100 has a first housing 1, a second housing 2 and a driver wheel 3 rotatably coupled to the interior of the first housing 1 at the right end of the first housing 1 (relative to the Figures) and configured to be in direct contact with the exterior surface of the second housing 2. In other embodiments (not shown), the driver wheel 3 is rotatably coupled to the interior of the first housing 1 to be in contact with an interior surface of the second housing 2. In other embodiments still, the driver wheel may be rotatably coupled to the exterior of the first housing 1 and be in contact with the exterior of the second housing 2.

Continuous rotation of the wheel 3 will cause the apparatus 100 to be moved from the first configuration to the second configuration and the third configuration of the apparatus 100. The positions of the housings 1, 2 relative to one another define the three configurations of the apparatus 100.

Shown in FIG. 1a is the first configuration in which the first and second housings 1, 2 overlie/overlap and abut one another. In this embodiment, the housings 1, 2 are dimensioned to be substantially the same length and width so that they completely overlap one another. In other embodiments (not shown), they may have differing lengths. In the embodiment shown, the lower surface 2b of the second housing 2 completely covers the upper surface 1a of the first housing 1.

Shown in FIG. 1b is the second configuration in which the first and second housings 1, 2 are slid apart relative to one another with respect to the first configuration, in that they are no longer substantially overlapping/overlying one another. In this embodiment, the second housing 2 is moved laterally away from the first housing 1 towards the right (as the arrow S depicts in FIG. 1a). The second housing 2 still overlaps by the first housing 1 by a distance approximately the same as the relative height of the first housing 1 (height measured from the upper surface 1a to the lower surface 1b of the first housing 1). The upper surface 1a is exposed in this configuration by the sliding movement of the second housing 2, in that the lower surface 2b of the second housing 2 no longer abuts the upper surface 1a and thereby exposes the upper surface 1a of the first housing 1.

Shown in FIG. 1c is the third configuration in which the second housing 2 is tilted at an angle relative to the first housing 1 and with respect to the second configuration. The direct contact of the wheel 3 with the second housing 2 means that continuous rotation of the driver wheel 3 can drive the movement of the apparatus 100 from the first configuration to the second and onto the third configuration. In this configuration, the upper surface 2a of the second housing 2 is tilted (rotated anticlockwise—in the opposite direction to the rotation of the driver wheel) towards the left end of the apparatus 100 (relative to the Figures).

In the first configuration, the housings 1, 2 overlie each other. As stated above, the housings 1, 2 are dimensioned to have substantially the same longitudinal length (measured in direction of the arrow S in FIG. 1a). The upper surface 1a of the first housing 1 is positioned to abut and to be immediately adjacent to the lower surface 2b of the second housing 2. The upper surface 1a of the first housing 1 is configured to be smooth in order to allow for the second housing 2 to slide along/across the second housing 2 in the direction of the arrow in FIG. 1a.

The driver wheel 3 has a circular cross section with a diameter that is smaller than the height of the first housing 1. As stated above, the wheel 3 is rotatably coupled to the first housing 1 at the right end of the first housing 1. The wheel 3 is rotatably coupled at the centre of the circular cross section of the wheel 3, and the coupling of the wheel 3 is positioned such that a small portion of the wheel protrudes from the upper surface 1a of the first housing 1 throughout complete rotation of the wheel. This provides for a small segment of the wheel 3 to extend above the upper surface 1a of the first housing 1 so as to be in direct contact with the lower surface 2b of the second housing 2. However, in this embodiment the protruding segment does not prevent the second housing 2 from substantially abutting the first housing 1, but is configured to only protrude enough to be in drive contact with the second housing 2.

The wheel 3 is configured such that the contact between the wheel 3 and the second housing 2 has some degree of friction to allow rotation of the wheel 3 to translate into a corresponding movement of the apparatus 100. In this embodiment, the wheel 3 is constructed of an elastomeric material that is configured to deform at the point of contact with the second housing 2 to provide a larger contact surface area and to ensure that the wheel 3 sufficiently frictionally 'grips' the second housing 2. In another embodiment the wheel 3 is made of a plastic material (for example, ABS, acrylic, PVC, etc) and provided with an outer layer of an elastomeric material to perform a similar function as the elastomeric wheel 3 in the first embodiment.

As stated above, the second housing 2 is positioned to abut the upper surface 1a of the first housing 1 in the first configuration. The surface of the second housing 2 is shaped to thereby define a profiled surface 7. This profiled surface 7 is shaped to allow for the respective sliding and tilting movements of the apparatus 100. In this respect, first portion 7a of the profiled surface 7 (this portion 7a runs the length of the lower surface 2b of the second housing 2) is dimensioned so as to be substantially flat (or linear) to allow the second housing 2 to abut the upper surface 1a of the first housing 1 during sliding movement between the first and second configurations. This portion 7a also allows the second housing 2 to be in direct drive contact with the driver wheel 3 in the first and second configurations. A second portion 7b of the profiled surface 7 of the second housing 2 (which is proximate to the second end 6a of the groove 6, see below) has a semi-circular shape that is, in this embodiment, of similar dimensions (radius, curvature, etc) to that of the driver wheel 3.

The first housing 1 has an arm 4 that is fixed to the first housing 1. The arm 4 extends from the first housing 1, proximate to the rotatable coupling of the driver wheel 3, to the inside of the second housing 2 in a direction perpendicular to the upper surface 1a of the first housing 1 to slidably couple the second housing 2 to the first housing 1.

In order to couple the two housings 1, 2 together, the arm 4 of the first housing 1 is provided with outwardly projecting tabs 5 positioned at its distal end (see FIG. 6a), and the second housing 2 has corresponding grooves 6 provided inside the housing 2. The projecting tabs 5 have a circular cross section in the direction of their projection from the arm 4. These grooves 6 effectively provide an open sliding channel for the projecting tabs 5 to be slidably coupled to. In this embodiment the sliding channels provided by the grooves 6 face inwardly toward each other and the projecting tabs 5 are configured to extend in an outward direction in order to slidably mate with these grooves 6. The grooves 6 and the tabs 5 are both dimensioned so that the tabs are securely retained within the grooves 6 but also capable of being freely slid along the length of the grooves. The tabs 5 are not so large that they become stuck within the grooves 6, but they are not so small such that they can slip out of the grooves 6. The same relative dimensional constraints apply to the grooves 6. In this embodiment the tabs 5 have a circular cross section and the grooves 6 are substantially straight with a constant width for receiving the tabs 5. The width is approximately the same as the diameter of the circular cross section of the tabs to allow for said free sliding. The arm 4 is also dimensioned to ensure that the tabs 5 are securely retained yet slidable within the grooves 6.

The inner surface of the sliding channels provided by the grooves 6 that is contacted by the tabs 5 is smooth to allow for ease of sliding movement of the tabs within the grooves 6. In this embodiment the smoothness is provided by a polishing of this surface but it could also be provided by a low friction coating (for example, Teflon™) or another material with a sufficiently low co-efficient of friction.

The length of the grooves 6 (longitudinal dimension—in direction of arrow S in FIG. 1a) is dimensioned to allow for a desired sliding length of the apparatus 100 (between the first configuration and second configuration). In this embodiment the grooves 6 are dimensioned to run for most of the length of the apparatus 100. In other embodiments (not shown), the grooves may be dimensioned to run for a shorter length than the length of the apparatus 100. The grooves 6 have respective first and second ends 6a, 6b. These ends 6a, 6b define the length of the grooves 6, and are dimensioned to be complementary to the circular shape of the projecting tabs 5 to allow for engagement of the tabs 5 at the first and second ends 6a, 6b of the grooves 6.

The arm 4 is dimensioned to have a length that keeps the profiled surface 7 of the second housing 2 in direct contact with the driver wheel 3 throughout movement of the apparatus 100 between the various configurations.

We will now describe the functional movement of the assembled apparatus 100. As the projecting tabs 5 are slidably engaged with the grooves 6, and the lower surface 2b of the second housing 2 abuts the upper surface 1a of the first housing 1, the second housing 2 is capable of sliding movement along the upper surface 1a of the first housing 1. As the driver wheel 3 is frictionally engaged with the profiled surface 7 of the second housing 2, rotation of the driver wheel 3 will cause this sliding movement of the second housing 2 relative to the first. Therefore, the rotation of the driver wheel 3 is able to move the apparatus 100 from the first configuration to the second configuration.

FIG. 2 illustrates the apparatus 100 when it is in a transitionary state between the first configuration and the second configuration via lateral sliding of the second housing 2 relative to the first housing 1. The frictional coupling between the driver wheel 3 and the contacted profiled surface 7 of the second housing 2 means that the rotation of the driver wheel 3 will exert a corresponding force on the second housing 2. The first portion 7a of the profiled surface 7 is configured to be substantially linear to allow for this lateral sliding movement. Rotation of the wheel 3 in the direction indicated by arrow R exerts a force on the second housing 2 in the direction indicated by arrow S. The second housing 2 will therefore be slid by rotation of the driver wheel 3. Movement of the apparatus 100 from the first configuration to the second configuration can therefore be effected by rotation of the driver wheel 3.

As the driver wheel 3 rotates the second housing 2 is slid and the grooves 6 are slid along the projecting tabs 5 until the tabs engage with the complementary shaped ends 6a/6b of the grooves 6. When the projecting tabs 5 engage with either of these respective ends 6a, 6b the sliding movement is terminated by said engagement. When the projecting tabs 5 engage with the first ends 6a of the grooves 6 the slidable movement of the apparatus 100 is terminated, and the first configuration is thereby provided. When the projecting tabs 5 engage with the second ends 6b of the grooves 6 the second configuration is thereby provided. The engagement of the projecting tabs 5 with the first and second ends 6a, 6b therefore helps to define the configurations of the apparatus 100.

Figure 3:
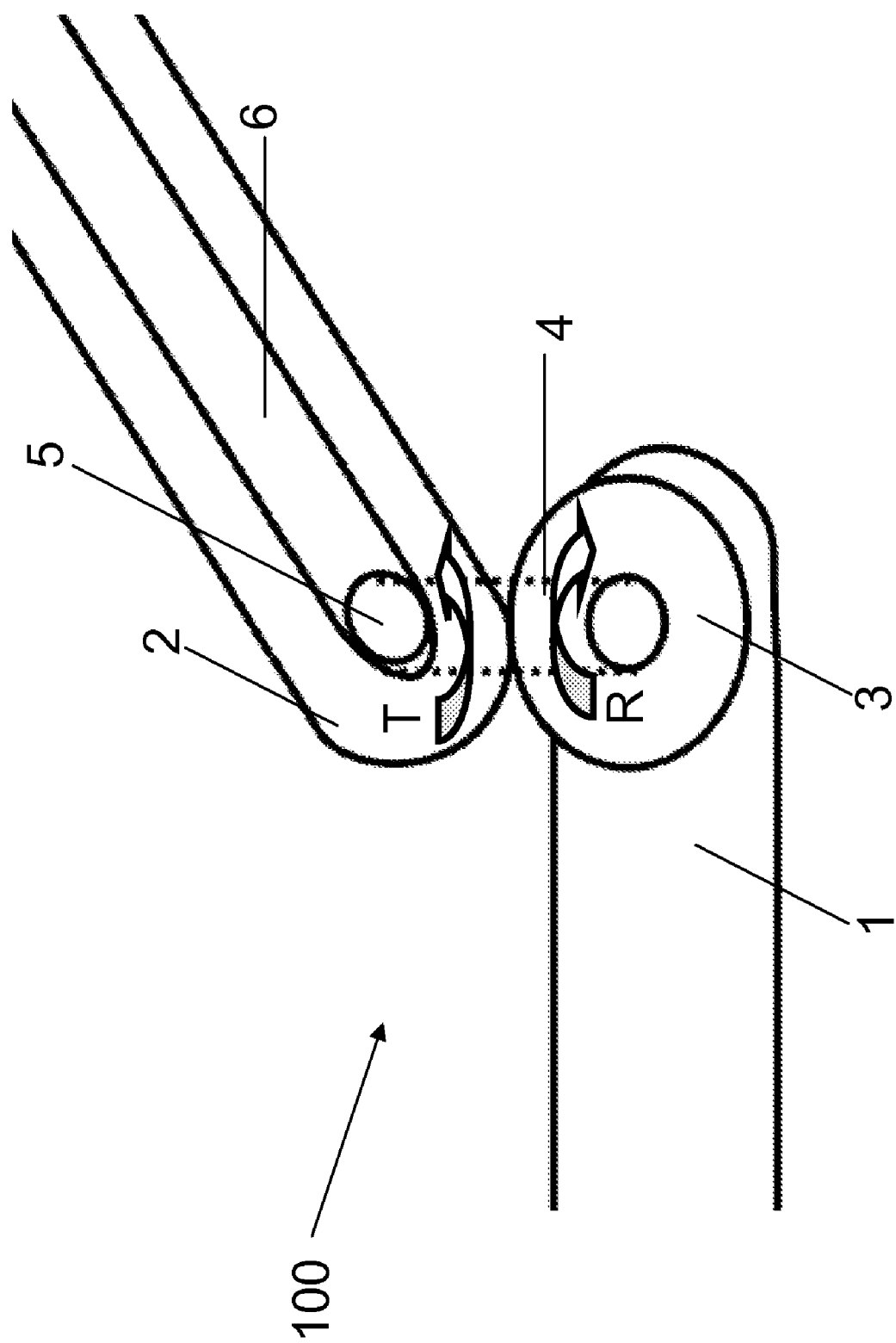
FIG. 3 shows a close-up of the driver wheel of FIG. 1 and its operation during the rotating movement of the apparatus from the second configuration to the third configuration.

Reference is now made to FIG. 3. When the apparatus 100 is in the second configuration, the circular cross section of the projecting tabs 5 engaged with the complementary second end 6b of the grooves 6 enables the projecting tabs 5 to act as a pivot point. As the second housing 2 does not substantially overlie the first housing 1 in this configuration the second housing 2 is free to rotate about that pivot point. In contrast, in the first configuration the second housing 2 completely overlies and abuts the first housing 1. As a result the second housing 2 is not free to rotate about the projecting tabs 5 engaged with the first end 6a of the grooves 6 but is only able to experience sliding movement.

The continuous rotation of the driver wheel 3 when the apparatus 100 is in the second configuration still exerts a corresponding force on the second housing 2. The sliding movement that was previously effected by the rotation of the driver wheel 3 is prevented by the engagement of the projecting tabs 5 with the second end 6b of the grooves. However, rotational movement is now possible due to this same engagement and the fact that the second housing 2 is free to rotate about the provided pivot point. The second portion 7b of the profiled surface 7 of the second housing 2 that is frictionally engaged by the driver wheel 3 therefore allows the driver wheel 3 to exert a corresponding turning force on the second housing 2.

FIG. 3 illustrates the apparatus 100 when it has been moved from the second configuration and is being moved towards the third tilted configuration. Continued rotation of the driver wheel 3 in the direction indicated by arrow R will, again, exert a corresponding force on the corresponding second portion 7b of the profiled surface 7 of the second housing 2 in the direction indicated by arrow T. This second portion 7b of the profiled surface 7 is configured to be substantially curved to provide for rotation of the second housing 2 about the pivot point. The corresponding force exerted by the rotation of the driver wheel 3 will cause the second housing 2 to be rotated about the pivot point. Therefore, movement of the apparatus 100 from the second configuration to the third configuration can be effected by the continued rotation of the driver wheel 3.

In summary, when the driver wheel 3 is in contact with the first portion 7a of the profiled surface 7 it acts like a wheel moving along a linear track. This results in a lateral sliding of the second housing 2 relative to the first housing 1. When the driver wheel 3 is in contact with the second portion 7b of the profiled surface 7 the system is comparable to two counter-rotating cogs, one being rotated by the other through driven contact. This results in a tilting movement of the second housing 2 about the provided pivot point.

As a result of this arrangement, the driver wheel 3 can move the apparatus 100 from the first configuration to the second configuration by continued rotation. The same mechanism can then move the apparatus 100 from the second configuration to the third configuration by the same continued rotation of the driver wheel 3. Continuous rotation of the driver wheel 3 can therefore drive movement of the apparatus 100 from the first configuration to the second configuration and onto the third configuration. The mechanism provides for both slidable movement and rotatable movement of the second housing 2 relative to the first housing 1.

It can therefore be seen that the profiled surface 7 of the second housing 2 is shaped so as to allow for the driver wheel 3 to control the respective sliding and tilting movements of the apparatus 100. It can also be seen that the profile of the surface 7 can be altered to suit the physical requirements of the apparatus 100, for example, to alter the sliding and/or tilting motion.

In this particular embodiment, the apparatus 100 has a motor (not shown) connected to the driver wheel 3 to control the rotation of the driver wheel 3. As there is only one driving mechanism for both the slide and tilt movements it is possible to only use one motor to provide for this movement. The motor may be conveniently driven by a power supply which also provides power to electronic components of the apparatus 100. For example, power may be supplied to user interface components, or radio telephone components provided in the apparatus 100.

Figure 11:
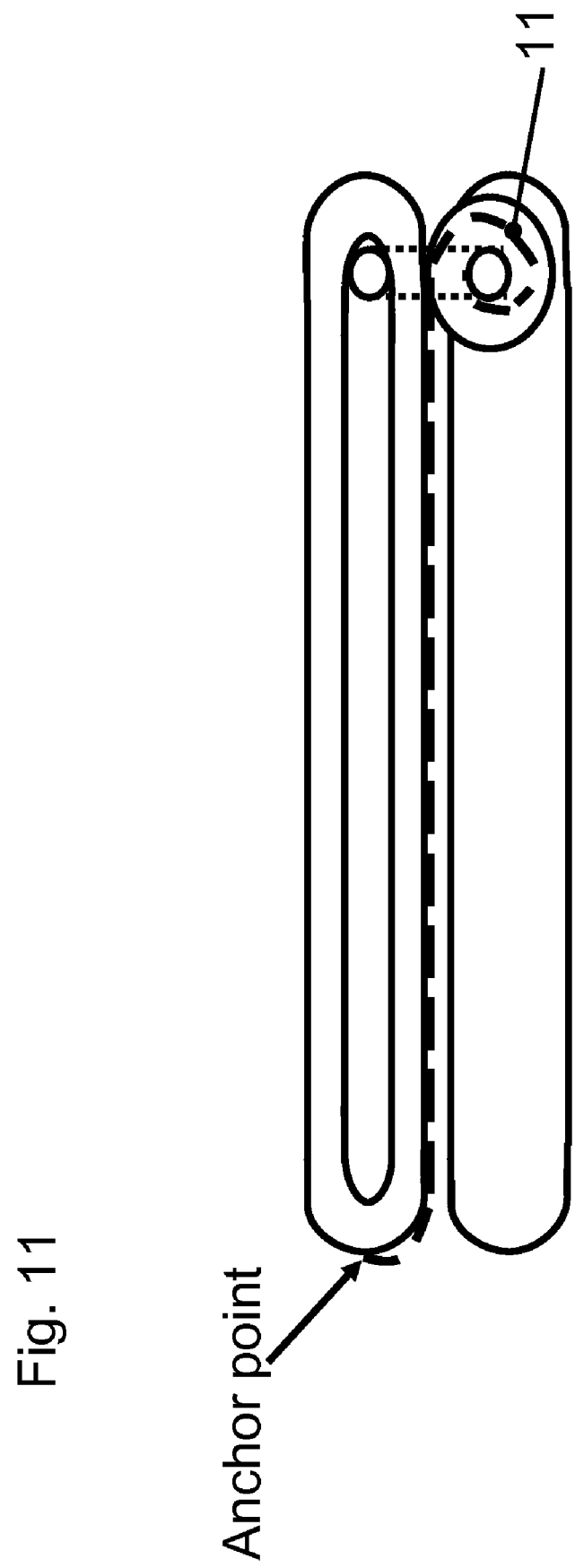
FIG. 11 shows a variation of the first embodiment in which a spring is configured to act as a biasing mechanism.

In another embodiment (shown in FIG. 11), the apparatus has a spring 11 connected to the driver wheel 3 and to the left end of second housing 2 (relative to the Figure). The spring 11 is a coil spring provided within the driver wheel 3, having a central axis being substantially the same as the axis of rotation of the driver wheel 3. One end of the spring 11 is connected to the driver wheel 3 and the other end extends from the driver wheel 3, between the first and second housings 1, 2 and is connected to the left end of the second housing 2. The spring 11 is configured to be held in a biased state in the first configuration, and to be released by a user activated mechanism (electronic/physical switch, for example). The spring 11 thereby acts a biasing mechanism on the wheel 3 and the second housing 2 when released. The second housing anchor point will experience a lateral sliding force upon release of the spring 11 from its held biased state, causing the wheel 3 to rotate and the second housing 2 to slide. In this embodiment, the spring 11 effects the continuous rotation of the driver wheel to move the apparatus 100 from the first configuration to the second and onto the third.

Other embodiments depicted in the figures have been provided with reference numerals that correspond to similar features of earlier described embodiments. For example, feature number 1 can also correspond to numbers 101, 201, 301 etc. These numbered features but may not have been directly referred to within the description of these particular embodiments. These have still been provided in the figures to aid understanding of the further embodiments, particularly in relation to the features of similar earlier described embodiments.

Figure 4:
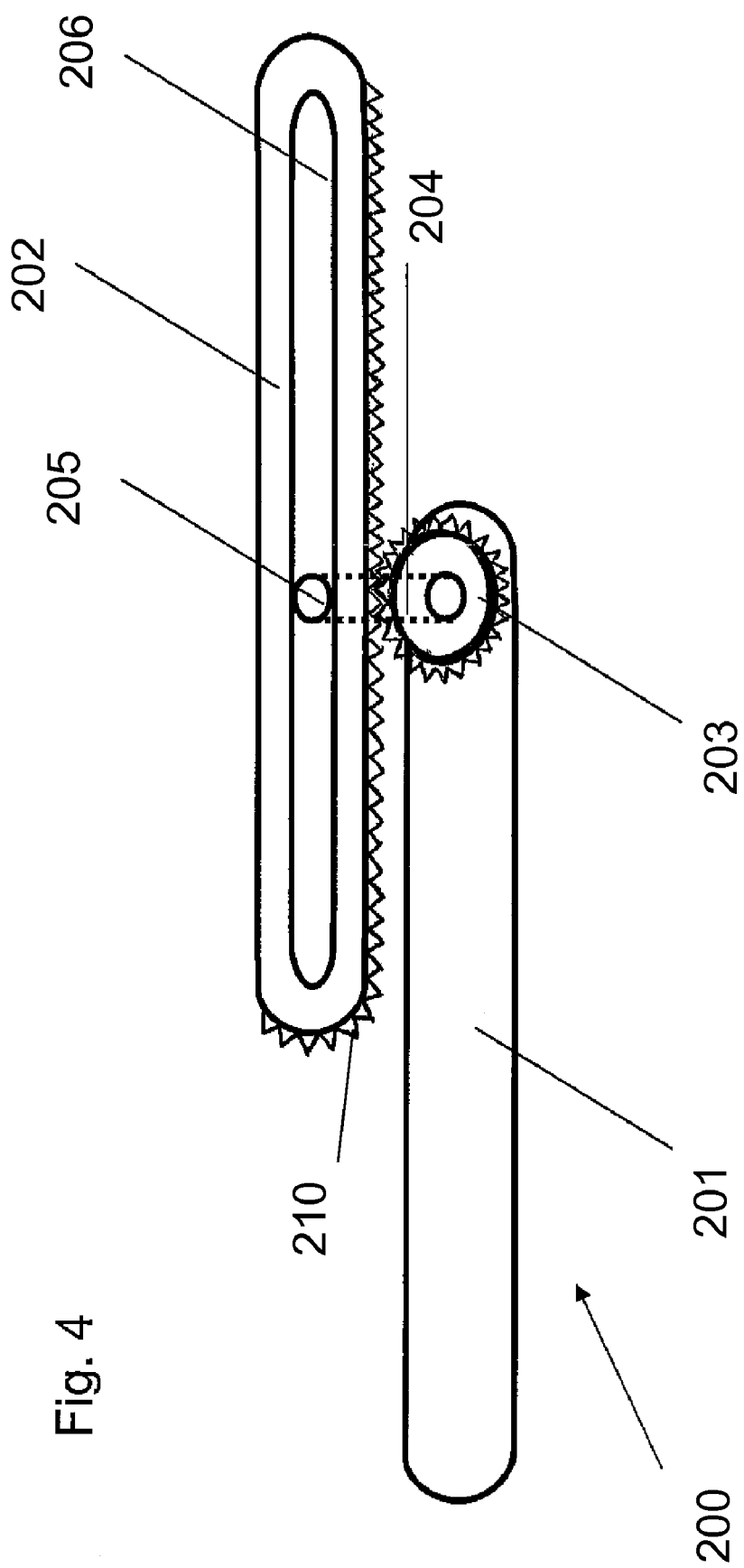
FIG. 4 illustrates a toothed variation of the driver wheel and the corresponding track according to a further embodiment.

FIG. 4 shows another embodiment wherein the driver wheel 203 is a toothed wheel. The corresponding surface of the second housing 202 is provided with a corresponding toothed track 210 that is coupled to the toothed driver wheel 203. Instead of the frictional coupling provided in the first embodiment, the mated teeth of the wheel 203 and the track 210 provide the grip needed to effect slidable/rotatable movement of the second housing 202 relative to the first housing 201.

FIG. 5 shows a further variation of the first embodiment. In this embodiment the apparatus 300 has a further fourth configuration. In the fourth configuration, the second housing 302 overlaps the first housing 301. In this configuration the second housing has been rotated through 180' from the position of the second configuration to overlie/overlap the first housing 301. The fourth configuration can be considered to be substantially the same as the first configuration, except that the surface of the second housing 302 that was previously covered and opposed to the first housing 301 is now exposed.

In a further variation of the embodiment of FIG. 5, the profiled surface of the second housing is provided with a rounded, curved profile at both ends in that both ends can rotatably engage the driver wheel. As a result, the apparatus is capable of being moved from the fourth (comparable to the first) configuration to the second configuration, onto the third configuration and onto the fourth/first configuration again. This provides for a cyclical movement of the apparatus between configurations, each cycle causing a different surface of the second housing to be exposed in the fourth/first configuration, in that they are alternately exposed.

In a further embodiment (not shown), the driver wheel comprises one or more detents. These detents provide for a plurality of detent tilted positions of the second housing relative to the first housing. This provides for a plurality of sub-configurations of the third configuration, the second housing adopting a different angle relative to the first housing in each one upon engagement of the second housing with each corresponding detent. This allows the user to select a variety of different angles for the apparatus.

By providing such a mechanism, it is possible to reduce the number of mechanisms needed to effect both sliding and tilting movement. Instead of two mechanisms and two motors being provided (i.e. one for each movement component), one mechanism and therefore one motor can be provided instead. This has several advantages over using multiple mechanisms. This can reduce the weight of an apparatus, the cost of manufacture, space taken up by the mechanism and the overall size of the apparatus in comparison with those apparatus that have two or more mechanisms, and it may also use less energy than such apparatus.

The above apparatus has been described in such a way that it can be applied to a variety of hand-portable electronic devices. For example, in mobile telephony applications, wherein the second housing can have and provide a user output area (a display, for example) on the exposed first surface of the second housing, and the first housing can have a user input area (for example a keypad) on the upper surface of the first housing. In this way, a device can be provided by the apparatus that can cover/uncover the user input area/user interface (input/output) depending on the configuration adopted by the apparatus. It would also provide a device that, in the third configuration, could tilt the user output area/user interface (input/output) towards a user of the device. The device could also be movable between all three configurations with the continuous rotation of the driver wheel (as set out above). The need to have two motors or two mechanisms to provide for the separate slide/tilt components in such an apparatus/device is therefore mitigated. A single motor to provide drive to the drive wheel 3 can be used.

It will be appreciated by the skilled person that whilst the operation of the apparatus has been described with regard to movement of the apparatus from the first configuration to the second and onto the third (and onto the fourth), movement between any of these configurations can be provided by the described mechanism. For example, third to second to first/fourth configuration (reverse).

It will also be appreciated by the skilled person that the functional arrangement offered by the driving mechanism of the apparatus is not limited to an apparatus with only two housings. This mechanism can be applied to apparatus with any number of housings that need to be arranged to be slidable, tiltable, foldable, rotatable, etc with respect to another housing that they are attached/attachable to. For example, additional modular housings could be attached, or configured to be attachable, to allow for this functionality (e.g. an additional keypad, touchpad, or display section module).

The skilled person will also appreciate that the driver wheel can be embodied in a variety of different ways to provide for the same effect of driving the movement of the apparatus via continued rotation. In one embodiment for example, the driver mechanism is provided by a plurality of wheels spaced apart from each other and in direct drive contact with the second housing to provide the abovedescribed functionality. In another embodiment two driver wheels are provided in two respective recesses or cavities provided on opposite outer sides of the first housing. In yet another embodiment, the driver wheel is a cylindrical drum that extends throughout the width of the first housing. In another embodiment, the driver is located substantially along the central axis of the first housing. Furthermore, the driver wheel may have an elliptical/cam shaped profile. The driver wheel could be located internal to the housings or external to the housings. The skilled person would therefore appreciate that the implementation of the abovedescribed apparatus is not limited solely to the driver wheel arrangements described herein.

Whilst the first embodiment has been described has having an arm that extends up into the second housing, having outwardly projecting tabs that slidably couple with the corresponding grooves (as in FIG. 6a), the skilled person will appreciate that other arrangements of slidably coupling the first and second housings together are possible. For example, FIG. 6b shows that the arm 404 can extend towards the second housing 402 from the outside and have inwardly projecting tabs 405 to slidably couple with corresponding grooves 406 of the second housing 402. Furthermore, as indicated by the dotted line in FIG. 6a, the housings 401, 402 may be coupled together by more than one arm 404. The arm may, of course, occupy a smaller space within the housings, for example, by not extending across the full width of the housings, (as in FIG. 6b). The skilled person would therefore appreciate that the implementation of the abovedescribed apparatus 400 is not limited solely to the arm coupling arrangements described herein.

FIG. 7 illustrates a flowchart of the method of assembly of the apparatus 100 of the first embodiment. This method involves the step 501 of assembling the driver wheel 3 and the first and second housings 1, 2 such that continuous rotation of the driver wheel 3 drives the apparatus 100 from the first configuration to the second configuration and onto the third configuration. The abovementioned design constraints should be considered when assembling the apparatus to ensure that continuous rotation of the driver wheel can drive the movement of the apparatus as described.

FIG. 8 illustrates the method of operation of a computer program for controlling the rotation of the driver wheel 3 of the apparatus 100 of the first embodiment. This method involves the step 601 of controlling rotation of the driver wheel 3 of the apparatus 100 to move the apparatus 100 from the first configuration to the second configuration and then onto the third configuration by continuously rotating the driver wheel 3. This computer program can be provided on a carrier, such as a computer/processor readable medium to provide this program. The program is configured such that, when run, it performs the abovementioned method as shown in FIG. 8. For example, the computer/processor readable media can be a disc such as a digital versatile disc (DVD) or a compact disc (CD). In other embodiments, the computer readable media may be any media that has been programmed in such a way as to carry out the abovementioned functionality.

Figure 9:
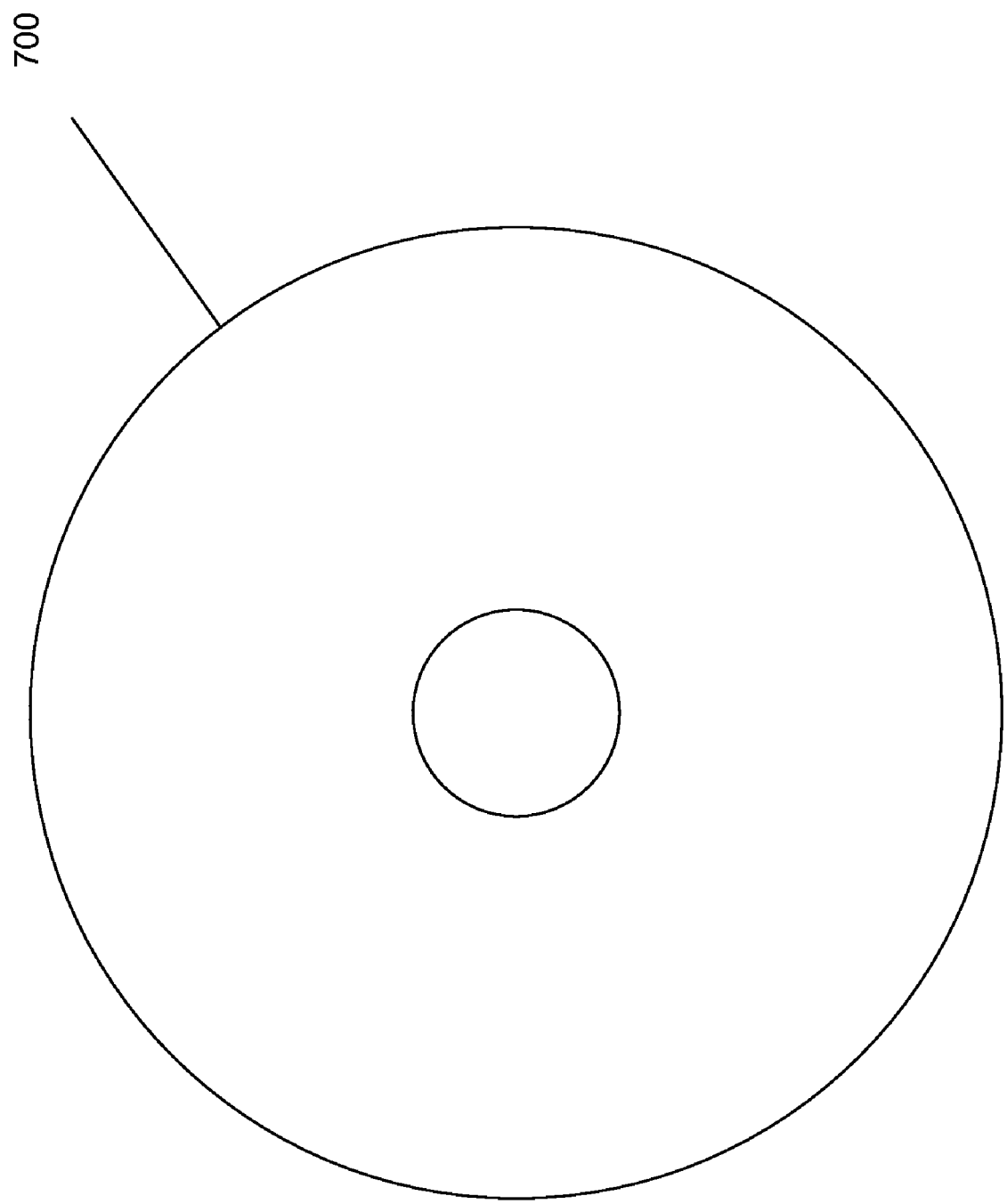
FIG. 9 illustrates schematically a computer readable media providing a program according to an embodiment of the present invention.

FIG. 9 shows such a computer readable medium 700 of a DVD for storing the computer program of the above embodiment.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a first and second housing and a driver wheel, the first and second housings coupled together to be driven by the driver wheel to provide for a plurality of apparatus configurations, the apparatus being configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another, and wherein the apparatus is configured such that continuous rotation of the driver wheel drives the movement of the apparatus from the first configuration to the second configuration and then onto the third configuration.

2. The apparatus as claimed in claim 1, wherein the driver wheel is configured to be in direct drive contact with a profiled exterior/interior surface of the second housing.

3. The apparatus as claimed in claim 2, wherein the driver wheel is configured to be frictionally coupled to the profiled surface of the second housing such that continuous rotation of the driver wheel frictionally drives the movement of the apparatus from the first configuration to the second configuration and then onto the third configuration.

4. The apparatus as claimed in claim 2, wherein the driver wheel is a toothed wheel configured to be coupled with a complementary track provided by the profiled surface of the second housing.

5. The apparatus as claimed in claim 1, wherein the apparatus comprises an arm that extends from the first housing to a groove provided by/in the second housing, the arm comprising a projecting member configured to slidably couple with the groove to provide for the coupling of the first and second housings, the arm, projecting member and groove configured to provide for the slidable movement of the apparatus between the first and second configurations.

6. The apparatus as claimed in claim 5, wherein the groove comprises a first and second end, the apparatus configured such that the slidable movement of the projecting member is terminated by engagement of the groove with the first end to provide the first configuration, and the second configuration, and the termination of said slidable movement, is provided by the engagement of the projecting member with the second end.

7. The apparatus as claimed in claim 6, wherein the engagement of the projecting member at the second end provides a pivot point, the apparatus being configured to be movable from the second configuration to the third configuration by rotation of the second housing about the pivot point, said rotation being driven by continuous rotation of the driver wheel.

8. The apparatus as claimed in claim 2, wherein the profiled surface of the housing comprises a first portion configured to provide for slidable movement of the apparatus from the first configuration to the second configuration, and a second portion configured to provide for rotation of the second housing relative to the first housing to move the apparatus from the second configuration TO the third configuration, the second portion being located proximal to a provided pivot to provide for movement between the second and third configurations.

9. The apparatus as claimed in claim 8, wherein the first portion of the profiled surface is configured to be substantially linear to provide for slidable movement of the apparatus, and the second portion of the profiled surface is configured to be substantially curved to provide for rotation of the second housing about the pivot.

10. The apparatus as claimed in claim 1, wherein the apparatus further comprises a biasing mechanism configured to drive the continuous rotation of the driver wheel.

11. An electronic device comprising the apparatus according to claim 1.

12. A method of assembling an apparatus, the apparatus comprising a first and second housing and a driver wheel, the first and second housings coupled together to be driven by the driver wheel to provide for a plurality of apparatus configurations, the apparatus being configured such that the first and second housings are slidable relative to one another from a first overlapping configuration, in which the first and second housings are substantially overlapping, to a second laterally slid configuration in which the first second housings are laterally slid with respect to one another, and then onto a third tilted configuration in which the first and second housings are tilted relative to one another, and wherein the apparatus is configured such that continuous rotation of the driver wheel drives the movement of the apparatus from the first configuration to the second configuration and then onto the third configuration; the method comprising assembling the driver wheel and the first and second housings such that continuous rotation of the driver wheel drives the apparatus from the first configuration to the second configuration and onto the third configuration.

13. A computer program, recorded on a non-transitory computer readable medium, the computer program configured to, when run on a computer, control rotation of the driver wheel of the apparatus of claim 1 to move the apparatus from the first configuration to the second configuration and then onto the third configuration by continuously rotating the driver wheel.

14. An apparatus comprising a first and second means for housing and a means for driving movement, the first and second means for housing coupled together to be driven by the means for driving movement to provide for a plurality of apparatus configurations, the apparatus being configured such that the first and second means for housing are slidable relative to one another from a first overlapping configuration, in which the first and second means for housing are substantially overlapping, to a second laterally slid configuration in which the first second means for housing are laterally slid with respect to one another, and then onto a third tilted configuration in which the first and second means for housing are tilted relative to one another, and wherein the apparatus is configured such that continuous rotation of the means for driving movement of the apparatus drives the movement of the apparatus from the first configuration to the second configuration and then onto the third configuration.

\* \* \* \* \*